July 2, 1935.  C. M. ROAN  2,006,654
DIRECTION TURN INDICATOR FOR VEHICLES
Filed May 19, 1932   5 Sheets-Sheet 2
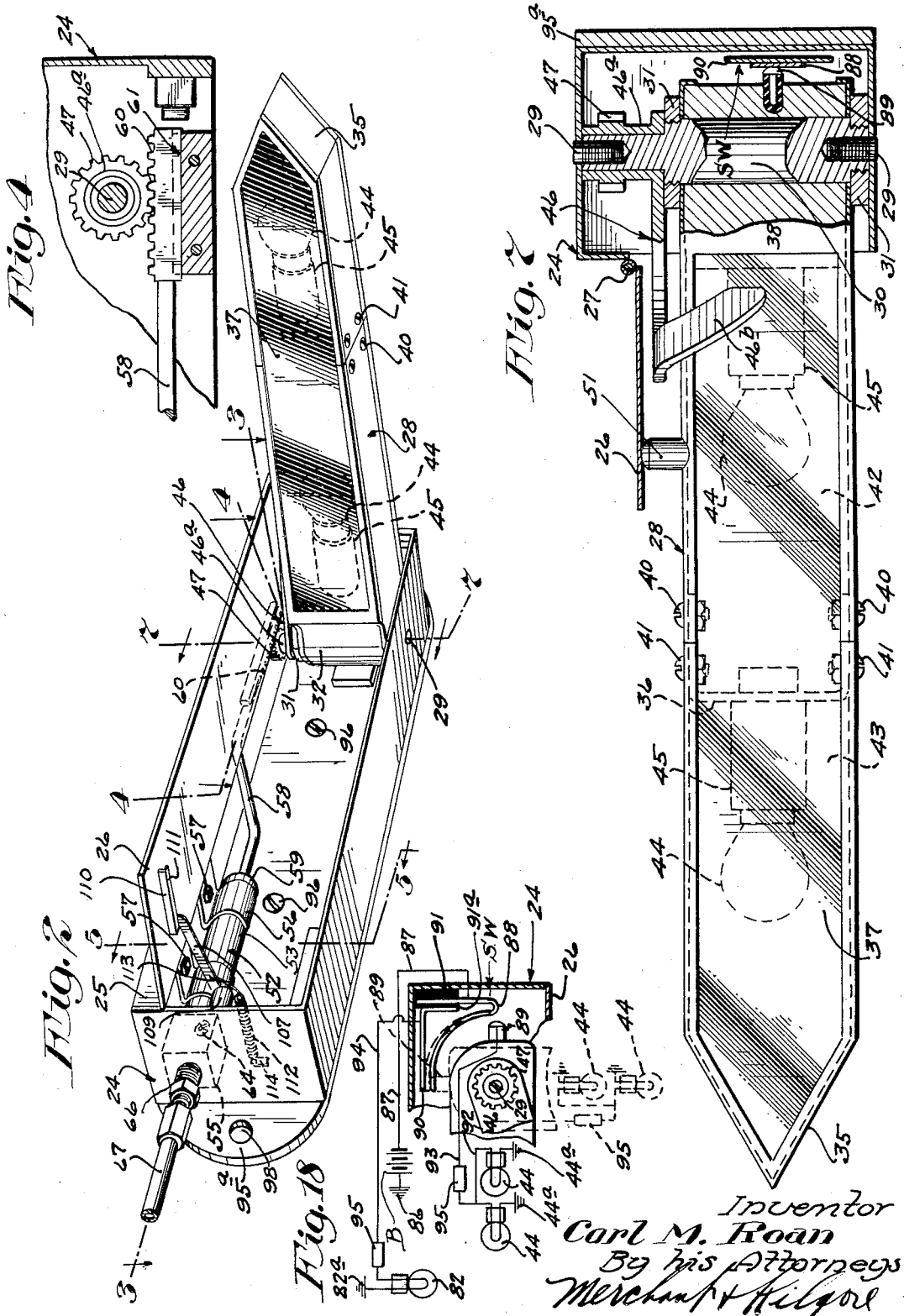
Inventor
Carl M. Roan
By his Attorneys
Merchant & Kilgore

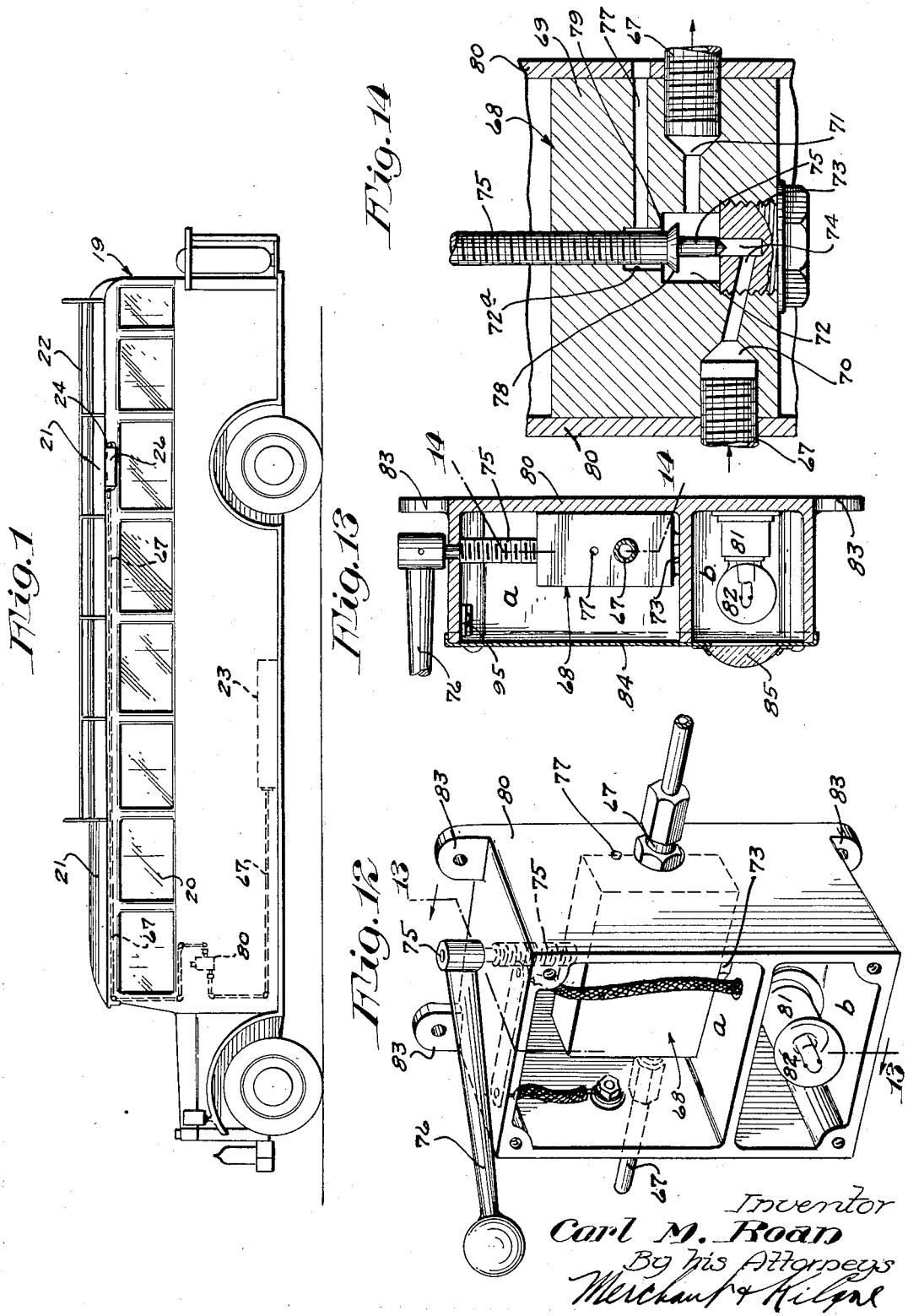

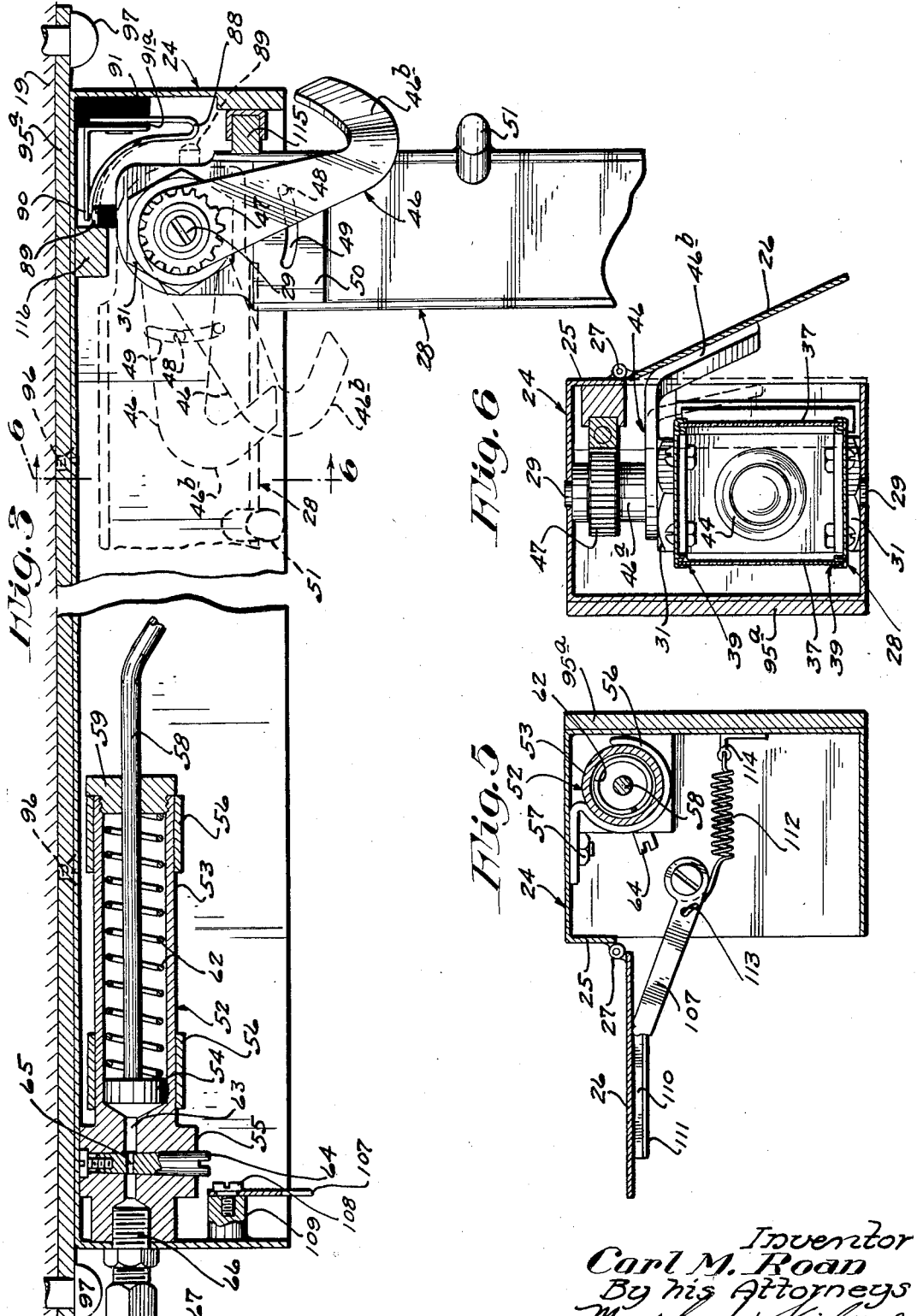

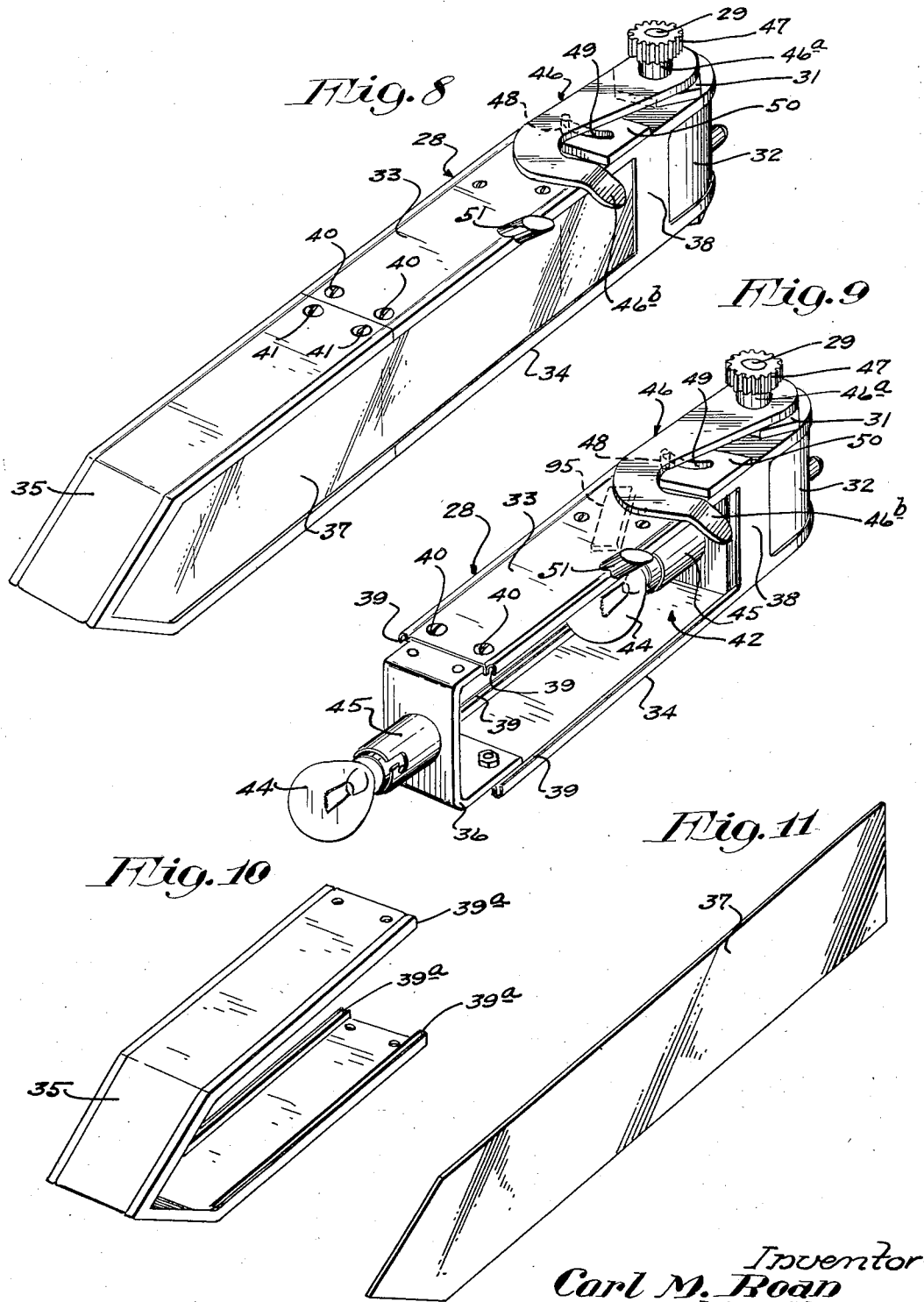

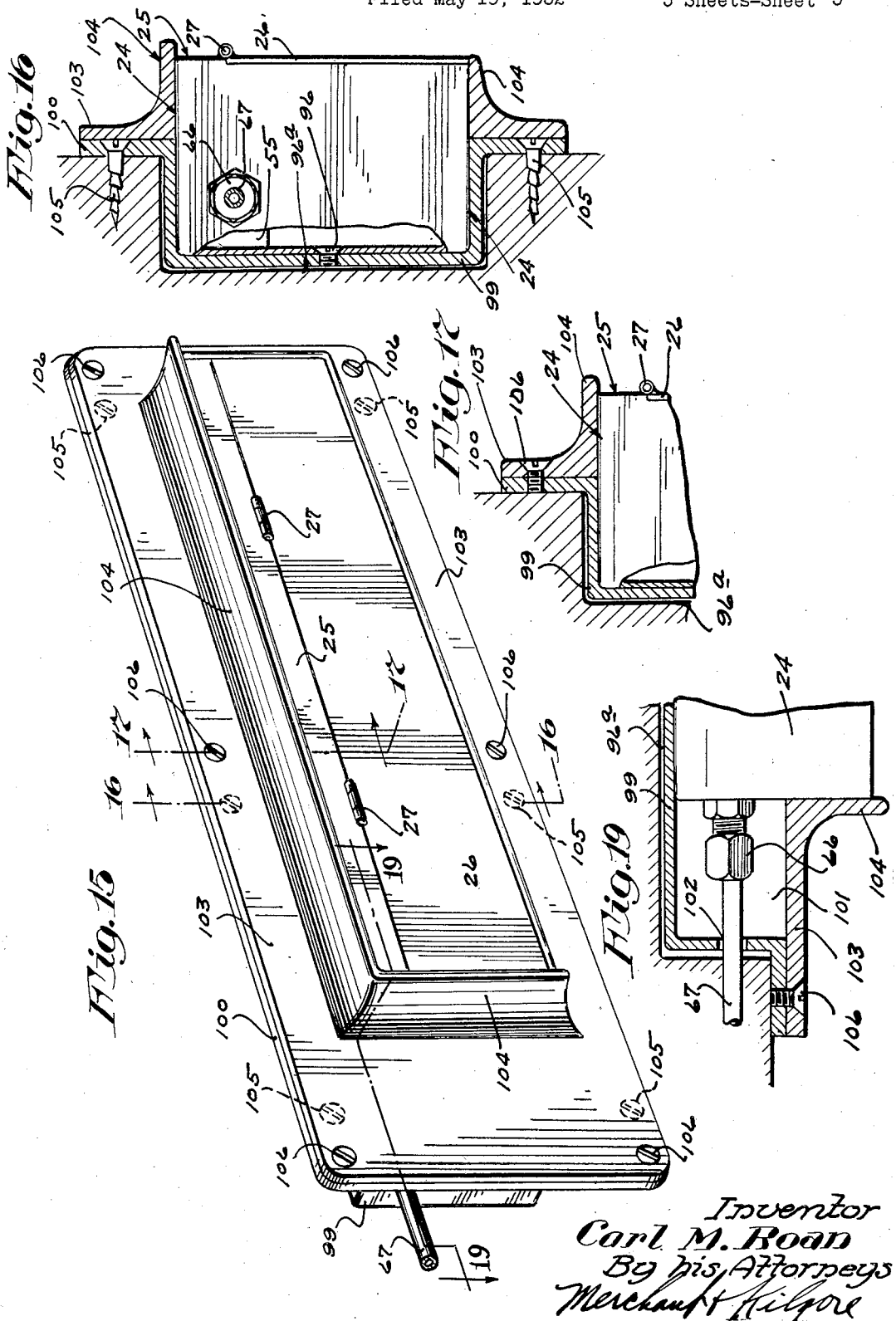

Patented July 2, 1935

2,006,654

UNITED STATES PATENT OFFICE 2,006,654

DIRECTION TURN INDICATOR FOR VEHICLES

Carl M. Roan, Minneapolis, Minn., assignor to Beacon Safety Signal Co., Minneapolis, Minn., a corporation of Minnesota Application May 19, 1932, Serial No. 612,236

10 Claims. (Cl. 116—54)

My present invention relates to direction turn indicators for vehicles, such as automotive buses, automobiles and the like and has among its important objects the provision of an extremely simple, relatively inexpensive, and highly efficient device of the class described. One object of the invention is the provision of a signalling device that is normally enclosed in a weather-tight casing and which is readily movable out of the casing and into a signalling position. Another object of the invention is the provision of an efficient mechanism for operating the signal. The above and other important objects and advantages of the invention will be made apparent from the following specification and claims.

Generally stated, the invention consists of the novel devices, combinations of devices and arrangement of parts hereinafter described and defined in the claims.

In the accompanying drawings, which illustrate the invention, like characters indicate like parts throughout the several views.

Referring to the drawings:

Fig. 1 is a view in side elevation of an automotive bus incorporating one of my improved direction turn indicating devices and its operating and control mechanism, the signal arm thereof being in a normal or inoperative position;

Fig. 2 is an enlarged perspective view of a complete indicator with its signal arm in an operative position;

Fig. 3 is a view in longitudinal horizontal section taken on the line 3—3 of Fig. 2, and on a scale still further enlarged than Fig. 2;

Fig. 4 is a fragmentary detail view taken in the vicinity of the line 4—4 of Fig. 2;

Fig. 5 is a transverse section taken on the line 5—5 of Fig. 2;

Fig. 6 is a transverse section taken on the line 6—6 of Fig. 3;

Fig. 7 is a view in transverse section taken on the line 7—7 of Fig. 2;

Fig. 8 is a perspective view of the signal arm of the device and certain associated parts;

Fig. 9 is a view similar to Fig. 8, but with the tip and translucent sides thereof removed;

Fig. 10 is a perspective view of the tip of the signal arm;

Fig. 11 is a perspective view of one of the translucent sides of the signal arm;

Fig. 12 is a perspective view, with some parts removed, of the control apparatus of the device;

Fig. 13 is a transverse vertical section taken on the line 13—13 of Fig. 12;

Fig. 14 is a detail sectional view taken approximately on the line 14—14 of Fig. 13;

Fig. 15 is a perspective view illustrating an indicator mounted in a receptacle that is adapted to be partially recessed in a body;

Fig. 16 is a transverse vertical section taken on the line 16—16 of Fig. 15;

Fig. 17 is a fragmentary view similar to Fig. 10 16 but taken on the line 17—17 of Fig. 15;

Fig. 18 is a diagrammatic view illustrating the electrical hook-up of the various electrical elements of the invention; and Fig. 19 is a detail sectional view taken on the line 19—19 of Fig. 15.

Of the parts of the bus illustrated, it is only necessary to note the body indicated as an entirety by 19, the windows thereof indicated by 20, the roof or top thereof indicated by 21 and which is provided with a luggage-carrying rack 22, and a compressed air tank or reservoir indicated at 23. It should here be understood that most buses of the present day employ compressed air brakes and are, therefore, customarily provided with an air reservoir such as the tank 23 and suitable means for maintaining a desired air pressure in the tank.

The casing of the turn indicator is indicated as an entirety by 24. This casing is open at its exposed side except at its extreme upper portion where it is closed by a down-turned lip 25. The exposed open side of the casing is provided with a shutter 26 that is pivotally suspended from the lip 25 by suitable hinges 27.

The signal arm of the indicator is indicated as an entirety by 28. This signal arm is normally contained within the casing 24 and is vertically pivoted thereto at one end for pivotal movements thereinto and thereout of, by means of opposed headless screws 29 that work one through the top and one through the bottom of of the casing 24, and which screws are quite tightly screwed into opposite ends of a double-ended trunnion 30. This trunnion 30 is extended through the axis of the signal arm 28 and is tightly but removably clamped thereto for movements therewith by means of opposed clamping nuts 31.

To remove the signal arm 28 from the casing, it is only necessary to remove the opposed screws 29 from the trunnion 30 through their respective portions of the casing, turn the complete signal arm and its trunnion a partial rotation, and withdraw the same through the casing opening.

The signal arm 28 is composed of a solid heel 32 and an extended shell that is made up of upper and lower plates 33 and 34, a tip 35 forming a detachable extension of the plates 33 and 34, a bracket 36, and the removable translucent side plates indicated by 37. The upper and lower plates 33 and 34 are clamped to their respective upper and lower portions of the heel 32 by the opposed clamping nuts 31 and near the junction of the heel-piece 32 and the shell of the signal arm, said plates 33 and 34 are connected at 38. Beyond the heel-piece 32, the plates 33 and 34 are formed at their opposite sides with opposed channels 39 for receiving the translucent side plates 37. The signal arm tip 35 is pointed at its free end to simulate the head of an arrow and is provided with channels 39ª that form extensions of the channels 39 when said tip is operatively positioned and receive the outer end portions of the translucent plates 37. The bracket 36 is secured to the free end portions of the plates 33 and 34 by means of screws 40 and projects beyond the free ends of said plates. The tip 35 of the signal arm is detachably secured to the projected portion of the bracket 36 by means of screws 41. The translucent side plates 37 may be of any suitable color but preferably and in accordance with accepted practice the one facing rear, when the signal arm is extended, will be red and the one facing front will be green.

The bracket 36 divides the interior of the signal arm into inner and outer compartments 42 and 43, respectively. These compartments are each equipped with a light bulb 44, that is detachably mounted in a socket 45 of the type most commonly used in automobile head lamps and the like. The socket 45 of the inner compartment 42 is mounted on and projects outwardly from the heel-piece 32 of the signal arm and the socket 45 of the outer compartment is mounted on and projects outwardly from the bracket 36.

With the signal arm constructed, as described, the light bulbs are readily accessible for replacement and the translucent side plates 37 are readily removed and replaced. It will be obvious that to gain access to the light bulbs, it is only necessary to remove the screws 41, draw the tip 35 longitudinally over the plates 37 and thereafter withdraw the plates 37 from the grooves or channels 39.

Pivotally mounted on the upper end portion of the trunnion 30 is a cam arm 46 having a hub 46ª that is formed with a pinion 47. This cam arm 46 is substantially L-shaped and is turned downwardly and outwardly near its free end to provide a shutter camming surface 46ᵇ. Pivotal movements of the cam arm 46 in respect to the trunnion 30 and signal arm 28 are limited by means of a pin 48 that is carried by and depends from the arm 46 and works in a segmental slot 49 in an underlying plate 50 that is rigidly carried by the signal arm. In its normal or inoperative position, the tip or free end of the cam arm 46 rests in very close relation to the then closed shutter 26, as shown by dotted lines in Fig. 6, and will, under initial outward pivotal movements, move free of the signal arm, and impart initial opening movements to the shutter in advance to moving the signal arm from the casing.

By special reference to Fig. 6, it will be noted that the tip of the cam arm primarily acts upon the lower intermediate portion of the shutter where its leverage is relatively great and very little power is required to move the shutter. Carried by and projecting outwardly and upwardly from the outer top edge of the signal arm is a cam lug 51 that engages the shutter 26 after the signal arm is moved out of its housing and before it has reached an operative position, and acts to lift the shutter away from the cam arm and into a substantially horizontal position. During retracting movements of the signal arm, this lug 51 acts to support the shutter and delay closing thereof, until the signal arm has been moved substantially back into the housing.

As a preferred means for operating the signal arm, I employ a fluid pressure motor 52, which includes a cylinder 53 and a piston 54. The cylinder 53 is disposed longitudinally of the casing and is formed at one end with an angular head 55 that is fitted into one corner of the casing and conforms to the contour thereof so as to prevent accidental rotation of the cylinder within the casing. The piston is detachably secured in position in the casing by means of a clamping bracket 56, and a suitable nut-equipped bolt 57. The piston 54 is provided with a projecting piston rod 58 that works through a removable head 59 at the inner end of the cylinder. This piston rod 58 is provided at its free end with a rack 60 that meshes with the pinion 47 and works slidably in a guide way 61. The piston 54 is at all times under strain of a coil compression spring 62 to be moved to its retracted inoperative position. This spring 62 is inserted into the cylinder through its open end when the removable head 59 is removed and is compressed between the piston 54 and said head when said head is secured in position.

The angular cylinder head is axially drilled to provide an air admission port 63 to the interior of the cylinder 53 and is drilled transversely to its axis to receive a valve 64. The valve 64 intersects the air inlet port 63 and is provided with a transverse passage 65, which passage will, under rotation of the valve, be brought into different degrees of registration with the port 53 and control flow through the port. The cylinder 53 is connected to the pressure tank or reservoir 23 through the port 63, suitable pipe fittings 66, and an air line 67, which air line includes a control valve 68, preferably located within convenient reach of the operator of the bus.

The controlling valve may be of any suitable character but the valve here illustrated has been found highly desirable and while not here claimed will probably be made the subject matter of an independent application. The valve 68 illustrated comprises a body 69 having an inlet port 70 and an outlet port 71, said ports receiving adjacent ends of the air line 67. Between the inlet and outlet ports, the body 69 is drilled from its bottom at right angles to the inlet and outlet ports to afford a valve chamber 72 between the inlet and outlet ports. This valve chamber 72 is closed at its bottom by a screw-threaded plug 73, which is formed with a passage 74 that connects the inlet port 70 with the valve chamber 72. The passage 74 communicates with the valve chamber through the axis of the plug and the portions of the plug surrounding the top of the passage 72, afford a seat for a needle valve 75. The needle valve 75 works through and has screw-threaded engagement with the upper portion of the body 69 and is provided at its projected upper end with an operating arm 76. The valve body 69 is further provided with an exhaust port 77 that leads from a reduced upper portion 72a of the valve chamber 72 to the atmosphere. The needle valve 75 is provided between its lower end and the upper portion of the main valve chamber 72 with a radially projecting tapered valve surface 78.

The valve surface 78 is adapted to seat against a cooperating seat formed by a shoulder 79 between the main valve chamber 72 and the reduced portion thereof 72a and when seated in said seat positively cuts off communication between the valve chamber and the atmosphere through the exhaust port. In a normal or inoperative position the needle valve 75 is screwed down upon its seat thereby cutting off communication between the inlet and outlet ports 70 and 71, respectively, and the valve surface 78 thereon will be off its seat thereby leaving the outlet port 71 in communication with the atmosphere through the exhaust port 77. When the needle valve is turned off its seat about one-half rotation, the inlet and outlet ports 70 and 71, respectively, will be connected and the valve surface 78 will be seated and cut off communication between the valve chamber and atmosphere.

The valve body 68 is preferably enclosed in the upper compartment a of a two compartment control box 80. The stem of the needle valve 75 works through the top of the box 80 and the operating lever 76 thereof is applied thereto above said box. The lower compartment of the indicator and control box, indicated by b, serves as a pilot lamp chamber and has mounted therein a light bulb socket 81 that is equipped with the light bulb 82. The box 80 may be mounted to a suitably fixed part of the interior of the bus by suitable screws or bolts applied through the mounting lugs 83 formed on said box. The exposed side of the control box is normally closed by a detachably applied cover plate 84 having a glass covered light aperture 85 therein opposite the pilot light chamber.

The electric lamps 44 of the signal arm and the pilot lamp 82 are energized from a suitable source of potential B which may be assumed to be the vehicle's storage battery through circuits shown clearly in Fig. 18 and immediately to be described. One side of the battery B is grounded at 86 to the metallic parts of the vehicle and at its other side said battery is connected by means of a lead 87 that is common to all circuits to a segmental spring contact 88 of a three contact illuminating system control switch SW and which contact 88 is also common to all circuits. The control switch SW further includes a contact 89 carried by but insulated from the heel 32 of the signal arm at a point radially offset from the axis thereof, and a fixed resilient contact 90. One end of the segmental spring contact 88 is rigidly secured to one end portion of and is insulated from the casing 24 at 91 and said contact is disposed with its segmental portion eccentric to the axis of the signal arm and its contact 89. The yielding fixed contact 90 is secured at one end to the casing in overlapping relation to the secured end of the contact 88 and is insulated therefrom and the casing at 91a. The free end of the contact 90 is normally disposed in close relation to but spaced slightly from the free end of the signal arm spring contact 88. The segmental contact 89 is normally, that is, when the signal arm is in a fully retracted or inoperative position, spaced from the adjacent portion of the segmental spring contact 88 but said signal arm contact engages the intermediate portion of the segmental conact during outward pivotal movements of the signal arm and when the signal arm is approximately midway between inoperative and fully operative positions. Under continued outward pivotal movements of the signal arm from a midway position and after initial engagement of the contact 89 with the contact 88 said contact 89, being eccentric to the axis of the segmental contact 88, will by camming action, move the same toward the free end of the yielding contact 90 and into engagement with said yielding fixed contact just before the signal arm reaches a completely extended operative position.

The signal arm lamp bulbs 44 are connected in parallel to the battery B in the following manner: One side of each bulb 44 is grounded to the metallic parts of the vehicle at 44a and connected therethrough to the grounded side 86 of the battery B. The opposite sides of the bulbs 44 are connected together by a lead 92 and through this lead and a lead 93 to the signal arm contact 89. The signal arm contact is, of course, engageable with the switch contact 88 and when so engaged the circuit of the light bulbs 44 is completed therethrough and the common lead 87, of which the lead 93 may be considered a branch lead, to the other side of the battery B.

The circuit of the pilot lamp bulb 82 is normally open and includes a ground connection 82a between one side of the bulb 82 and the grounded side of the battery B, a lead 94 connecting the other side of said bulb to the yielding fixed contact 90 and through said contact 90 and the common lead 87 to the opposite side of the battery B. The lead 94 constitutes another branch of the common lead 87.

Interposed, one in the lead 94 of the pilot lamp circuit and one in the lead 93 of the signal arm lamps 44, are conventional flashers that alternately open and close their respective circuits when the same are completed through the switch SW and cause the lamps to produce a rapid succession of flashes during their operative periods.

It will now be apparent that the signal arm lamps 44 and pilot lamp 82 will be inoperative when the signal arm is in an inoperative retracted position within its casing and that the signal arm lamps 44 will be rendered operative to produce a series of flashes when the signal arm is moved to or beyond its intermediate position and further that the pilot lamp 82 will flash only when the signal arm is in a substantially fully extended position. By flashing the signal arm lamps a very attractive and therefore very effective turn indication is produced. The pilot lamp 82 indicates to the operator of the vehicle that the signal is in a fully extended position and due to its flashing action is so effective that it will continually remind the operator that the signal is in an operative position, thereby minimizing the possibilities of the operator's forgetting and leaving the signal in an extended operative position. Failure of the pilot lamp to illuminate when the needle valve 75 is turned to its signal arm operating position will, of course, indicate to the operator that the signal arm has not been moved to a completely extended operative position.

There are illustrated in the drawings two mounting devices for the indicator casing 24, one thereof being illustrated in Figs. 1, 2, 3, 5, 6, and 7 and the other thereof being shown in Figs. 15 to 17, inclusive and 19. The first noted of these devices comprises a mounting plate 95ᵃ that projects completely across the back of the casing 24 and beyond the ends thereof. This plate 95ᵃ is detachably secured to the back of the casing by screws or the like 96 applied through the back of the casing from the interior thereof and said mounting plate 95ᵃ is detachably secured to the vehicle body by screws, bolts or the like 97 applied through apertures 98 in the projected ends thereof. When this form of mounting is employed, the complete indicator casing 24 extends beyond the plane of the adjacent portion of the vehicle body.

The second form of mounting device illustrated, see Figs. 15 to 17 inclusive and 19, is made up of a receptacle 99 having projecting flanges 100 at its open side. This receptacle 99 is adapted to receive the casing 24 of the indicator but is somewhat longer than the indicator casing to afford a coupling chamber at one end. The air pressure line 67, it will be noted, extends through an opening 102 in the end of the receptacle 99 adjacent the coupling chamber 101 and the couplings 66 thereof are within and accessible through the open side of the chamber 101. In the particular instance illustrated, the receptacle 99 is of less depth than the signal housing 24 so that said signal housing projects beyond the flanged receptacle. The flanged receptacle 99 is provided with a removable cover plate 103 having an outwardly projecting shield flange 104 surrounding the projecting portion of the signal housing. The top and front edges of this flange project beyond the signal housing and the rear and bottom thereof terminate in the plane of the signal housing 24. The projecting top and front edges of the flange 104 protect the indicator housing from rain, snow, sleet and wind created by forward movement of the vehicle. The receptacle 99 is adapted to be recessed in a vehicle body with its flanges 100 overlying the surrounding portions of and secured to the body by means of suitable screws or the like 105. The cover plate 103 of the receptacle is detachably secured to the flanges 100 of the receptacle by screws or the like 106. The indicator housing 24 is secured in the receptacle by means of screws 96ᵃ applied through the back of the indicator housing and screwed into the adjacent back wall of the receptacle 99 from the interior of the indicator housing.

To remove the indicator housing from the receptacle, the cover plate 103 is first removed. With this done, the coupling chamber 101 is open, and the couplings 66 are easily accessible and are removed. The mounting screws 96ᵃ are now removed, access thereto being gained by opening the shutter 26 and moving the signal arm to an operative position. When this form of mounting is employed, the indicator housing 24 will be very inconspicuous when the signal arm is retracted although the turn indication, when the signal arm is extended, will be as equally effective as when the first noted form of mounting is employed.

As here illustrated, the indicating unit is located on the left-hand side of the vehicle and employed as a left-hand turn indicator but obviously it may be located on the right-hand side of the vehicle and employed as a right-hand turn indicator, in which latter instance the complete indicating unit will be turned end for end and this will render it necessary or desirable to interchange the translucent side plates 37 to keep the red thereof facing the rear end, and the green thereof facing front when the signal arm is extended.

Although the shutter 26 tends to close under the action of gravity, it is desirable to incorporate means for positively holding the shutter against rattling or accidental opening movements but which means will offer a minimum of resistance to outward movements of the cam arm 46 and the signal arm. For this purpose I provide a yielding retracting device including an arm 107 that is pivoted at 108 to a casing lug 109. At its free end the lever 107 works slidably in a guideway 110 formed by a channel member 111 rigid on the inner surface of the shutter 26. The lever 107 is under tension of a spring 112 to move the lever 107 to a nearly vertical shutter closed position. The spring 112 has hooked engagement at one end with the lever 107 near its pivot 108 at 113 and at its other end is anchored to the casing, by means of a bracket 114, at a point slightly below the plane of the lever's pivot 108.

With the described closing device, the spring has a maximum shutter closing pressure on lever 107 when said lever and shutter are in their closed or inoperative positions and gradually approaches its dead center and becomes increasingly ineffective as the shutter and lever are moved to their extreme upper operative positions; and the lever 107, because it engages the outermost portion of the channel 110 when the shutter is closed and the innermost portion thereof when the shutter is open, has maximum leverage and exerts maximum closing pressure on the shutter, when it is closed and becomes increasingly ineffective on the shutter, as the shutter approaches a completely open position. In this manner, spring closing pressure applied to the shutter is decreased during opening movements of the shutter in approximately the same degree as the action of gravity increase.

Operation

From the foregoing it will be apparent that when the operator turns the valve 75 to an operative position, by means of the handle 76, the piston 54 will be moved by air pressure to the right in respect to Fig. 3, against the action of the spring 62 thereby extending the piston rod 58 and rack 60 and turning the pinion 47 in a counter-clockwise direction. The cam arm 46, being formed with the pinion 47 and being free for limited movements in respect to the signal arm, will move outward in advance to the signal arm and impart initial opening movements to the shutter before the signal arm is moved and will thereafter pick up the signal arm and move the same therewith from the casing. The lug 51 of the signal arm will, during outward movements of the signal arm, pick up the shutter and raise the same free of the cam arm 46.

It will further be apparent that when the operator turns the valve 75 to its inoperative position the piston 54, piston rod 58 and its rack 60 will be retracted by means of the spring 62 and the pinion 47 and its integrally formed arm 46 will be turned in a clockwise direction. The cam arm 46 will move into engagement with the signal arm and thereafter move the same therewith to a retracted position and during most of such movement of the signal will support the shutter and delay closing thereof, until the signal arm has moved substantially back into the casing, this being due to the fact that during inward movement of the signal arm, the cam arm 46 is against the signal arm.

Outward movement of the signal is limited by means of resilient bumpers 115 and 116 carried by the indicator housing and one engaging the signal arm and the other engaging the signal arm contact 89 at the limit of the outward movement of the signal arm. The bumper absorbs the impact thereby quieting operation of the device and taking the strain off of the parts.

What I claim is:

1. A direction turn indicator comprising a housing having an open exposed side, a shutter hinged at its upper edge to the open side thereof, a signal arm pivoted to and normally within said housing, a cam having a limited pivotal movement in respect to said arm, and power means operative on said cam and through said cam on said signal arm, said cam being operative to impart initial opening movement to said shutter in advance of the movement of said signal arm.

2. A direction turn indicator comprising a housing having an open exposed side, a shutter hinged at its upper edge to the open side thereof, a signal arm pivoted to and normally within said housing, a cam having a limited pivotal movement in respect to said arm, and power means operative on said cam and through said cam on said signal arm, said cam being operative to impart initial opening movement to said shutter in advance of the movement of said signal arm, said cam at the limit of its outward movement serving to transfer the open shutter onto said arm whereby closing movement of said shutter will be delayed until said signal arm has been moved back substantially into said housing.

3. A direction turn indicator comprising a housing having a shutter hinged at its upper edge to the open side thereof, a signal arm pivoted to and normally within said casing, a cam pivoted concentric to the axis of the signal arm for limited pivotal movements in respect to the arm, and power means operating on said cam and through said cam on said signal arm, said cam being operative to impart initial movement to said shutter in advance of the movement of said arm.

4. The structure defined in claim 3 in which the means for operating the signal arm includes a fluid pressure motor, a rack operated by the fluid pressure motor, and a pinion carried by said cam at a point concentric with its pivot and meshing with said rack.

5. A direction turn indicator comprising a housing having a hinged shutter at its exposed side, a signal arm normally contained within the casing and pivoted near one end thereof to the casing by means including a double-ended trunnion extending between opposite walls of the casing, a cam pivotally mounted on said trunnion for limited pivotal movements in respect to the signal arm, a pinion carried by said cam, and power means operative on said cam and through said cam on said said signal arm including a rack meshing with said pinion, said cam being operative to impart initial opening movement to said shutter in advance of the movement of said arm.

6. A direction turn indicator comprising a housing having an open exposed side, a shutter hingedly connected to and normally closing the open side of said housing, a signal arm pivoted to and normally within the housing, a cam having limited pivotal movement in respect to said arm, and power means operative on said cam and through said cam on said signal arm, said cam being operative to impart initial movement to the shutter in advance of movement to said signal arm toward an extended position.

7. A direction turn indicator comprising a housing having an open exposed side, a shutter hingedly connected to the open side of said housing, a signal arm pivoted to and normally within said housing, a cam having a limited pivotal movement in respect to said arm, and power means operative on said cam and through said cam on said signal arm, said cam being operative to impart initial opening movement to said shutter in advance of the movement of said signal arm, said cam at the limit of its outward movement serving to transfer the open shutter onto said arm whereby closing movement of said shutter will be delayed until said signal arm has been moved back substantially into said housing.

8. A direction turn indicator comprising a housing having an open exposed side, a shutter hingedly connected to the open side of the housing and normally closing the same, a signal arm pivoted to and normally within said housing, a cam pivoted concentric to the axis of the signal arm for limited pivotal movements in respect to the arm, and power means operating on said cam and through said cam on said signal arm, said cam being operative to impart initial movement to said shutter in advance of the movement of said arm.

9. A direction turn indicator comprising a housing having a hinged shutter at its exposed side, a signal arm pivoted to and normally within said housing, means for swinging said arm to and from projected position, and means for imparting initial opening movement to said shutter in advance of the movement of said arm from normal position, said means for moving the signal arm including a motor cylinder, a piston working in the cylinder and connected to the signal arm, a source of compressed fluid connected to the motor cylinder, and a valve for controlling the flow of motor fluid.

10. The structure defined in claim 8 in which the means for operating the signal arm includes a fluid pressure motor, a rack operated by the fluid pressure motor, and a pinion carried by said cam at a point concentric with its pivot and meshing with said rack.

CARL M. ROAN.